(12) United States Patent
Oh et al.

(10) Patent No.: US 12,725,281 B2
(45) Date of Patent: Sep. 1, 2026

(54) MOTION MAGNIFICATION DEVICES AND METHODS OF USING THEREOF

(71) Applicants: POSCO CO., LTD., Pohang-si (KR); RESEARCH INSTITUTE OF INDUSTRIAL SCIENCE & TECHNOLOGY, Pohang-si (KR); POSTECH RESEARCH AND BUSINESS DEVELOPMENT FOUNDATION, Pohang-si (KR)

(72) Inventors: Tae Hyun Oh, Pohang-si (KR); Sungbin Kim, Pohang-si (KR); Sang Hyeok Park, Pohang-si (KR); Laekyoung Lee, Pohang-si (KR); Jun Young Seo, Daegu (KR)

(73) Assignees: POSCO CO., LTD, Pohang-si (KR); RESEARCH INSTITUTE OF INDUSTRIAL SCIENCE & TECHNOLOGY, Pohang-si (KR); POSTECH Research and Business Development Foundation, Pohang (KR)

( * ) Notice: Subject to any disclaimer, the term of this patent is extended or adjusted under 35 U.S.C. 154(b) by 245 days.

(21) Appl. No.: 18/692,031

(22) PCT Filed: Dec. 16, 2022

(86) PCT No.: PCT/KR2022/020641

§ 371 (c)(1),
(2) Date: Mar. 14, 2024

(87) PCT Pub. No.: WO2023/121161

PCT Pub. Date: Jun. 29, 2023

(65) Prior Publication Data

US 2025/0131577 A1 Apr. 24, 2025

(30) Foreign Application Priority Data

Dec. 21, 2021 (KR) ........................ 10-2021-0184021

(51) Int. Cl.
*G01P 13/00* (2006.01)
*G06T 7/00* (2017.01)
(Continued)

(52) U.S. Cl.
CPC .............. *G06T 7/248* (2017.01); *G01P 13/00* (2013.01); *G06T 7/0004* (2013.01); *G06T 7/40* (2013.01);
(Continued)

(58) Field of Classification Search
CPC ......... G06T 7/248; G06T 7/0004; G06T 7/40; G06T 7/579; G06T 7/20; G06T 7/60;
(Continued)

(56) References Cited

U.S. PATENT DOCUMENTS

2016/0217587 A1 7/2016 Hay
2016/0345832 A1 12/2016 Pavagada Nagaraja et al.
(Continued)

FOREIGN PATENT DOCUMENTS

DE 10 2018 104 913 A1 9/2019
JP 2002-366297 A 12/2002
(Continued)

OTHER PUBLICATIONS

Ordonez et al., Detection of human vital signs in hazardous environments by means of video magnification, 2018, PLOS One (2018) pp. 1-15. (Year: 2018).*
(Continued)

*Primary Examiner* — Kathleen M Broughton
(74) *Attorney, Agent, or Firm* — Sughrue Mion, PLLC

(57) ABSTRACT

Disclosed is a motion amplification device including: an encoder receiving a first frame and a second frame arbi-
(Continued)

trarily adjacent in an image, and decomposing the first frame into first shape information and first texture information and decomposing the second frame into second shape information and second texture information; a first module generating a third frame in which a motion of an object is amplified based on the first shape information, the second shape information, and the second texture information; a second module analyzing an intensity of the motion based on the first shape information, the second shape information, and the first texture information; and a third module generating amplification image data indicating the intensity of the motion on the third frame.

10 Claims, 4 Drawing Sheets

(51) Int. Cl.
*G06T 7/246* (2017.01)
*G06T 7/40* (2017.01)
*G06T 7/579* (2017.01)

(52) U.S. Cl.
CPC .... *G06T 7/579* (2017.01); *G06T 2207/20084* (2013.01); *G06T 2207/30164* (2013.01)

(58) Field of Classification Search
CPC . G06T 2207/20084; G06T 2207/30164; G06T 2207/10016; G06T 2207/20081; G06T 3/40; G01P 13/00; G06N 3/08
See application file for complete search history.

(56) References Cited

U.S. PATENT DOCUMENTS

| | | | | |
|---|---|---|---|---|
| 2017/0083748 | A1* | 3/2017 | Zhou | G06F 18/211 |
| 2018/0220085 | A1 | 8/2018 | Astrom et al. | |
| 2020/0134791 | A1* | 4/2020 | Berlin | G06V 10/25 |

FOREIGN PATENT DOCUMENTS

| | | | |
|---|---|---|---|
| JP | 2018-156640 | A | 10/2018 |
| KR | 10-2009-0120842 | A | 11/2009 |
| KR | 10-2013-0077379 | A | 7/2013 |
| KR | 10-2045871 | B1 | 11/2019 |
| KR | 10-2020-0128239 | A | 11/2020 |
| KR | 10-2021-0101135 | A | 8/2021 |

OTHER PUBLICATIONS

Oh et al., Learning-based Video Motion Magnification, 2018, arXiv:1804.02684v3, pp. 1-26. (Year: 2018).*

Dorkenwald et al., Unsupervised Magnification of Posture Deviations Across Subjects, 2020, IEEE/CVF Conference on Computer Vision and Pattern Recognition, pp. 1-12. (Year: 2020).*

Peng et al., Camera-Based Micro-Vibration Measurement for Lightweight Structure Using an Improved Phase-Based Motion Extraction, 2020, IEEE Sensors J., 20(5) 2590-2599. (Year: 2020).*

Wang et al., Frequency response functions of shape features from full-field vibration measurements using digital image correlation, 2012, Mechanical Systems and Signal Processing 28(2012): 333-347. (Year: 2012).*

Dai et al., Micro-motion Based Target Recognition Using Regularized DCNN, 2021, CIE International Conference on Radar, pp. 1-6. (Year: 2021).*

Xu et al., Moving Object Detection Based on Improved Three Frame Difference and Background Subtraction, 2017, Int. Conference on Industrial Informatics, pp. 1-5. (Year: 2017).*

Monin et al., Single-pixel imaging of dynamic objects using multi-frame motion estimation, 2021, Scientific reports, (2021) 11: pp. 1-11. (Year: 2011).*

Japanese Office Action dated Apr. 8, 2025 in Application No. 2024-537495.

International Search Report issued Mar. 20, 2023 in International Application No. PCT/KR2022/020641.

Written Opinion of the International Searching Authority issued Mar. 20, 2023 in International Application No. PCT/KR2022/020641.

Office Action dated Apr. 7, 2026, in Korean Application No. 10-2021-0184021.

* cited by examiner

Figure 2:
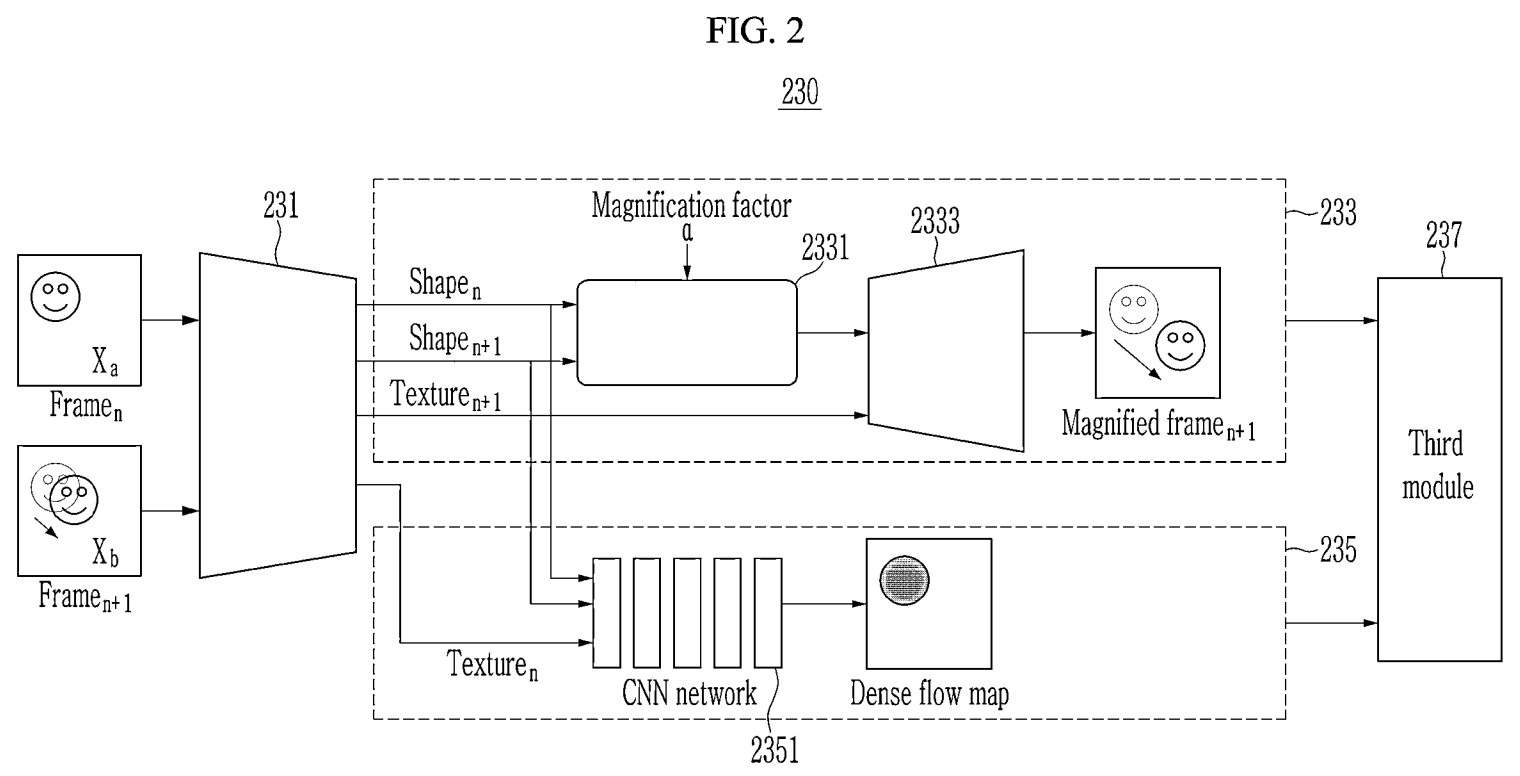

Frame$_n$
$X_a$
Frame$_{n+1}$
$X_b$
231
Shape$_n$
Shape$_{n+1}$
Texture$_{n+1}$
Texture$_n$
233
Magnification factor
α
2331
2333
Magnified frame$_{n+1}$
235
CNN network
2351
Dense flow map
237
Third module

MOTION MAGNIFICATION DEVICES AND METHODS OF USING THEREOF

CROSS-REFERENCE TO RELATED APPLICATIONS

This is a National Stage of International Application No. PCT/KR2022/020641 filed Dec. 16, 2022, claiming priority based on Korean Patent Application No. 10-2021-0184021 filed Dec. 21, 2021, the entire disclosures of which are incorporated by reference herein.

TECHNICAL FIELD

The present disclosure relates to motion amplification devices and methods of using thereof.

BACKGROUND ART

If a problem occurs in facilities used in an industrial field, abnormal vibration or behavior occurs. For example, abnormal vibration may occur in the direction of a rotational axis, not a rotational direction, for an aging rotating body facility. Universally, a method of checking, by an inspector, a defect of the facility with the naked eye is used, but it is difficult to check the size of the vibration when a vibration frequency is high, judgment may vary depending on a subject of the inspector, and the long-term monitoring is cumbersome.

As a result, a motion magnification technology that amplifies and visualizes a micro-motion to visualize the defects of the facilities is used. The motion amplification technology usually uses an Eulerian method that estimates movement from physical quantity changes of an object that passes through each point fixed in a space.

DISCLOSURE

Technical Problem

There is a problem that a motion amplification technology does not provide an accurate numerical value of the intensity of the motion, an essential element to determine whether the facility have the defect Further, there is a problem in that the intensity of the motion amplified through a conventional motion amplification device is not equal to a predetermined amplification coefficient Furthermore, there is a disadvantage in that a quality of an amplified image is not good.

The present disclosure has been made in an effort to provide a numerical value of a motion jointly with motion amplification of a facility.

The present disclosure has been made in an effort to quantitatively analyze the motion simultaneously with amplifying and visually representing the motion of an object.

Technical Solution

An exemplary embodiment of the present disclosure provides a motion amplification device including: an encoder receiving a first frame and a second frame arbitrarily adjacent in an image, and decomposing the first frame into first shape information and first texture information and decomposing the second frame into second shape information and second texture information; a first module generating a frame in which a motion of an object is amplified based on the first shape information, the second shape information, and the second texture information; a second module analyzing an intensity of the motion based on the first shape information, the second shape information, and the first texture information; and a third module generating amplification image data indicating the intensity of the motion on the frame in which the motion is amplified.

The first module may multiply a difference between the first shape information and the second shape information by a predetermined amplification coefficient to generate new shape information, and synthesize the generated shape information, first shape information, and the second texture information to generate the frame in which the motion is amplified.

The second module may be configured to calculate each pixel change between the first frame and the second frame based on the first shape information and the second shape information, and analyze the intensity of the motion of the object according to each calculated pixel change.

The second module may be configured to analyze the intensity of the motion of the object by using a convolutional neural network (CNN) trained to analyze the intensity of the motion from input shape information of arbitrary frames.

The motion amplification device may further include: a memory storing a vibration threshold for the object; and an output unit outputting the amplification image data, and the third module may determine that an area in which the motion exceeding the threshold is detected is a dangerous area which needs to be checked when the intensity of the motion exceeds the vibration threshold, and generate the amplification image data to indicate the dangerous area on the amplification image data.

Another exemplary embodiment of the present disclosure provides a motion amplification method including: receiving a first frame and a second frame arbitrarily adjacent in an image, and decomposing the first frame into first shape information and first texture information and decomposing the second frame into second shape information and second texture information; generating a frame in which a motion of an object is amplified based on the first shape information, the second shape information, and the second texture information; analyzing an intensity of the motion based on the first shape information, the second shape information, and the first texture information; and generating amplification image data indicating the intensity of the motion on the frame in which the motion is amplified.

The generating of the frame in which the motion is amplified may include multiplying a difference between the first shape information and the second shape information by a predetermined amplification coefficient to generate new shape information, and synthesizing the generated shape information, the first shape information, and the second texture information to generate the frame in which the motion is amplified.

The analyzing of the intensity of the motion may include calculating each pixel change between the first frame and the second frame based on the first shape information and the second shape information, and analyzing the intensity of the motion of the object according to each calculated pixel change.

The analyzing of the intensity of the motion may further include analyzing the intensity of the motion of the object by using a convolutional neural network (CNN) trained to analyze the intensity of the motion from input shape information of arbitrary frames The generating of the frame in which the motion is amplified may include determining that an area in which the motion exceeding the threshold is detected is a dangerous area which needs to be checked when the intensity of the motion exceeds a vibration threshold prestored for the object, and generating the amplification image data to indicate the dangerous area on the amplification image data.

Yet another exemplary embodiment of the present disclosure provides a recording medium having a program performing a motion amplification method which may be stored therein.

Still yet another exemplary embodiment of the present disclosure provides a program which may be stored in a recording medium to perform the motion amplification method.

According to at least one of exemplary embodiments of the present disclosure, a more accurate motion amplification result can be acquired.

According to at least one of exemplary embodiments of the present disclosure, motion analysis of an object is easy.

According to at least one of exemplary embodiments of the present disclosure, a part which needs to be checked in the object can be visually represented.

DESCRIPTION OF THE DRAWINGS

FIG. 2 is a block diagram of a control unit of a motion amplification device according to the present disclosure.

MODE FOR INVENTION

Figure 1:
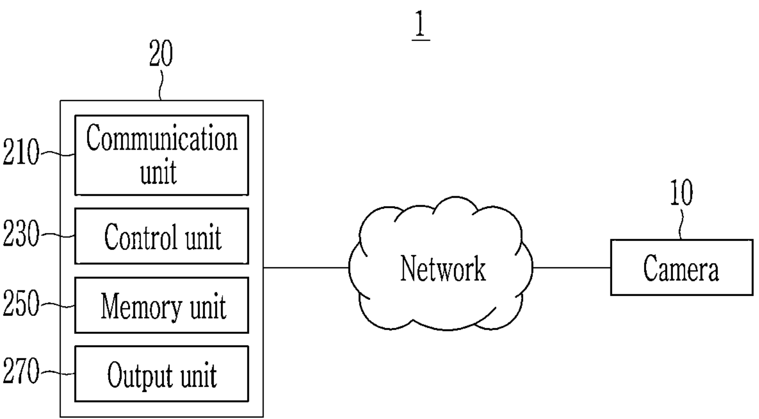
FIG. 1 is a block diagram of a motion amplification system according to an exemplary embodiment of the present disclosure.

Hereinafter, exemplary embodiments disclosed in this specification will be described in detail with reference to the accompanying drawings and the same or similar components are denoted by the same or similar reference numerals, and duplicated description thereof will be omitted. Suffixes "module" and "unit" for components used in the following description are given or mixed in consideration of easy preparation of the present disclosure only and do not have their own distinguished meanings or roles. Further, in describing the embodiment of the present disclosure, a detailed description of related known technologies will be omitted if it is determined that the detailed description makes the gist of the embodiment disclosed in the present disclosure unclear. Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Hereinafter, exemplary embodiments of the present disclosure will be described in detail with reference to the accompanying drawings.

FIG. 1 is a block diagram of a motion amplification system according to an exemplary embodiment of the present disclosure.

The motion amplification system 1 includes a camera 10 and a motion amplification device 20.

The camera 10 and the motion amplification device 20 may be connected through a network.

In the present disclosure, the network means a connection structure in which mutual information exchange is enabled between respective nodes such as devices and servers, and an example of the network includes local area network (LAN), wide area network (WAN), broadband network (BBN), wireless LAN (WLAN), Long Term Evolution (LTE), LTE Advanced (LTE-A), Code-Division Multiple Access (CDMA), Wideband Code Division Multiplex Access (WCDMA), Universal Mobile Telecommunication System (UMTS), Wireless Broadband (WiBro), Global System for Mobile Communications (GSM), Bluetooth Low Energy (BLE), Bluetooth, Zigbee, Ultra-Wideband (UWB), ANT, Wi-fi, infrared data association (IrDA), Personal Area Network (PAN), but is not limited thereto.

The camera 10 is a device that photographs an object for which a motion is to be analyzed, and may have various-shape image sensors such as Charge Coupled Device (CCD), Complement Metal Oxide Semiconductor (CMOS), etc. For example, the camera 10 may photograph a facility at an operation site.

The camera 10 may acquire an image of an object in real time. The image photographed through the camera 10 may be transmitted to the motion amplification device 20 through the network.

The motion amplification device 20 is a device for analyzing the image received from the camera 10, detecting a micro-motion present in the image, and amplifying and analyzing the detected micro-motion.

The motion amplification device 20 includes a communication unit 210, a control unit 230, a memory unit 250, and an output unit 270.

The communication unit 210 is used to communicate with the camera 10 through the network. The communication unit 210 may deliver the image received from the camera 10 to the control unit 230.

The control unit 230 may include an artificial neural network for learning an image stored in the memory unit 250.

The artificial neural network includes a plurality of layers, and the plurality of layers are connected by a plurality of operations to which weights are applied. In other words, the artificial neural network includes the plurality of layers including the plurality of operations to which the weights are applied. Here, the plurality of layers including the plurality of operations include a convolution layer performing a convolution operation, a pooling layer performing a down sampling operation, an unpooling layer UL performing an up sampling operation, a deconvolution layer DL performing a deconvolution operation, etc.

On the other hand, training an artificial neural network provides an input having an output known to the neural network to generate a predicted output, and compares the predicted output and the known output through the neural network, and modifies an algorithm of the artificial neural network so that a difference value between the input and the output is reduced. For example, the artificial neural network may be trained by a gradient decent scheme. This may be repeated several times, and the artificial neural network may show a more accurate output through the repetition.

The control unit 230 may detect a micro-motion according to time in an image including a plurality of frames by using the artificial neural network, and amplify the detected micro-motion. The control unit 230 may generate an amplification image including the amplified micro motion. The amplification image is an image in which an area in which the micro-motion is detected is emphasized in the delivered image. That is, the amplification image is an image in which the micro-motion is amplified and reconfigured according to a predetermined amplification coefficient. The amplification image may be constituted by a plurality of amplified image frames.

The control unit 230 may analyze a pixel-wise movement displacement by using the artificial neural network. Further, the control unit 230 may derive a vibration intensity of the micro-motion through the analyzed pixel-wise movement displacement. Hereinafter, the pixel-wise movement displacement is referred to as a intensity of the micro-motion. The control unit 230 may generate data so that the intensity of the micro-motion is displayed jointly in the image. Furthermore, the control unit 230 may also generate amplification image data so that the intensity of the micro-motion is displayed jointly in the amplification image. The amplification image data is data in which the analyzed intensity of the micro-motion is displayed jointly in the amplification image.

The control unit 230 may include an artificial neural network that additionally learns the generated amplification image and amplification image data in addition to learning the image stored in the memory unit 250.

The control unit 230 may determine whether the analyzed intensity of the micro-motion exceeds a predetermined threshold. If the intensity of the micro-motion exceeds the threshold, the control unit 230 may determine that an area in which the micro-motion which exceeds the threshold is detected is a dangerous area for which checking is required.

The control unit 230 may deliver the amplification image and the amplification image data to the output unit 270.

The memory unit 250 stores the image received from the camera 10, the amplification image generated by the control unit 230, the amplification image data including the intensity of the micro-motion, an arbitrary data set required for training the artificial neural network of the control unit 230, a threshold of vibration per facility, etc. Here, it is described that the memory unit 250 is located in the motion amplification device 20, but the memory unit 250 may also be a separate database which is located outside the motion amplification device 20, and communicates with the motion amplification device 20.

The output unit 270 may be a display that outputs the data delivered from the control unit 230. For example, the output unit 270 may output the amplification image and the amplification image data. Further, the output unit 270 may also output an image in which the intensity of the motion is displayed in the image received from the camera 10.

A user may determine whether the object photographed by the camera 10 needs to be checked through the output unit 270.

FIG. 2 is a diagram illustrating a configuration of the control unit of the motion amplification device according to the present disclosure.

The control unit 230 includes an encoder 231, a first module 233, a second module 235, and a third module 237.

The encoder 231 is a component that decomposes a received frame into shape information and texture information. Specifically, the encoder 231 spatially decomposes each of two received frames to acquire shape information Shape n and texture information Texture n for each frame.

The encoder 231 may receive, from the memory unit 250, two arbitrary adjacent frames, and shape information and texture information for two frames. The encoder 231 may be trained to satisfy a regularization term so as to decompose the received frame into the shape information and the texture information. The regularization term may include, for example, a regularization that the shape information should be the same even though the texture is changed in one frame in order to decompose the shape information and a regularization that the textures in two adjacent frames should be the same in order to decompose the texture information. The encoder 231 may be trained until already known shape information and texture information are output with respect to two frames delivered from the memory unit 250.

Thereafter, the trained encoder 231 may receive two arbitrary adjacent frames Frame n and Frame n+1 in the image delivered from the communication unit 210. The encoder 231 may deliver shape information Shape n and Shape n+1 and texture information Texture n and Texture n+1 decomposed with respect to respective frames to a first module 233 and a second module 235.

The first module 233 as a component that generates an amplification frame for the frame received from the encoder 231 includes a manipulator 2331 and a decoder 2333.

The manipulator 2331 is a component that amplifies a difference between the shape information Shape n and Shape n+1, i.e., the micro-motion. Specifically, the manipulator 2331 may receive shape information Shape n and Shape n+1 decomposed with respect to two consecutive frames, respectively from the encoder 231, and then acquire the difference between the shape information. Thereafter, the manipulator 2331 multiplies the difference between the shape information by a specific amplification coefficient $\alpha$ to generate new shape information Shape n+1' including the amplified micro-motion. Here, the amplification coefficient $\alpha$ may be a predetermined coefficient.

The manipulator 2331 may deliver the new shape information Shape n+1' to the decoder 2333.

The decoder 2333 is a component that synthesizes the texture information and the shape information into one frame.

Specifically, the decoder 2333 synthesizes the texture information Texture n+1 decomposed by the encoder 231 and the shape information Shape n+1' amplified by the manipulator 2331 into one frame to generate a frame n+1' of which movement is amplified globally.

The second module 235 is a component for analyzing the intensity of the micro-motion between the frames received from the encoder 231. Specifically, the second module 235 generates a flow map showing a result of calculating movements in all pixels by applying an optical flow technology to two consecutive frames input into the encoder 231 to analyze the intensity of the micro-motion.

The optical flow technology is a technology that estimates motion information on an object which spatially moves in the frame, e.g., an instantaneous speed by calculating a one-way function for spatial and temporal coordinates of the object. Specifically, the optical flow technology may acquire information on a motion of the object within two frames, e.g., a motion intensity by finding a correspondence between two input frames by using a change of a pixel between adjacent frames and a time interval between the adjacent frames. The optical flow technology belongs to a Lagrangian method.

The second module 235 may analyze the motion intensity of the object by using the trained artificial neural network. Meanwhile, in FIG. 2, it is illustrated that when the second module 235 analyzes the intensity of the micro-motion, the second module 235 uses a convolutional neural network (CNN) 2351 model, but the present disclosure is not limited thereto, and the second module 235 may use an arbitrary artificial neural network.

The CNN 2351 is an artificial neural network configured by a convolution layer. The CNN 2351 may be trained to analyze the motion intensity through an arbitrary data set delivered from the memory unit 250. The CNN 2351 may be trained until a loss value which is a difference between an analysis result and a correct answer becomes a reference value or less.

The second module 235 may analyze a motion intensity value between the shape information of the frames input from the encoder 231 through the trained CNN 2351. That is, the flow map may be a value acquired by inputting the frames into the pre-trained CNN 2351.

In summary, the shape information Shape n and Shape n+1, and the texture information Texture n are input into the second module 235 and the pixel change between two shape information Shape n and Shape n+1 is calculated to perform a quantitative analysis of the movement displacement of each pixel As described above, the second module 235 may analyze the motion intensity of the object in the frame received from the camera 10 through the communication unit 210 by using the artificial neural network.

Consequently, the motion amplification device 20 may generate the amplification image through the first module 233, and generate the flow map by analyzing the motion intensity for the object through the second module 235.

The third module 237 may generate the amplification image data representing the motion intensity analyzed by the second module 235 on the frame in which the motion is amplified by the first module 233. When the analyzed movement displacement of the object exceeds a specific threshold, the third module 237 may also generate amplification image data further indicating a warning indication in a part having vibration which exceeds the threshold.

However, in a method of generating the amplification image in which the motion is amplified by deep learning, it may be difficult to completely decompose the frame into the shape information and the texture information only by training the CNN 2351 just by adding the regularization term to the encoder. When the frame is not completely decomposed into the shape information and the texture information, a wobble effect may be generated, in which a boundary and a background of the object having the micro-motion are jointly amplified, and unstably wobbled. In this case, since accurate motion intensity measurement is impossible, an amplification image which does not coincide with a predetermined amplification coefficient may be output.

On the contrary, the motion amplification device 20 provides the shape information Shape n and Shape n+1 and the texture information Texture n and Texture n+1 which are the output of the encoder 231 to the first module 233 which is an Eulerian method based motion amplification model and the second module 235 which is a Lagrangian method based optical flow model.

The motion amplification device 20 is possible to train both the first module 233 and the second module 235 with one data, so the motion amplification device 20 is data-efficient.

Thereafter, information on the flow map which is the output of the second module 235 is provided to the first module 233, so the encoder 231 may completely decompose the input frame into the shape information and the texture information according to the flow map, so there is a low possibility that the wobble effect will be generated. Further, the intensity for the motion of the object may be accurately analyzed through the second module 235, so an amplification image may be acquired which coincides with a size of an amplification coefficient to be amplified in the first module 233.

Figure 3:
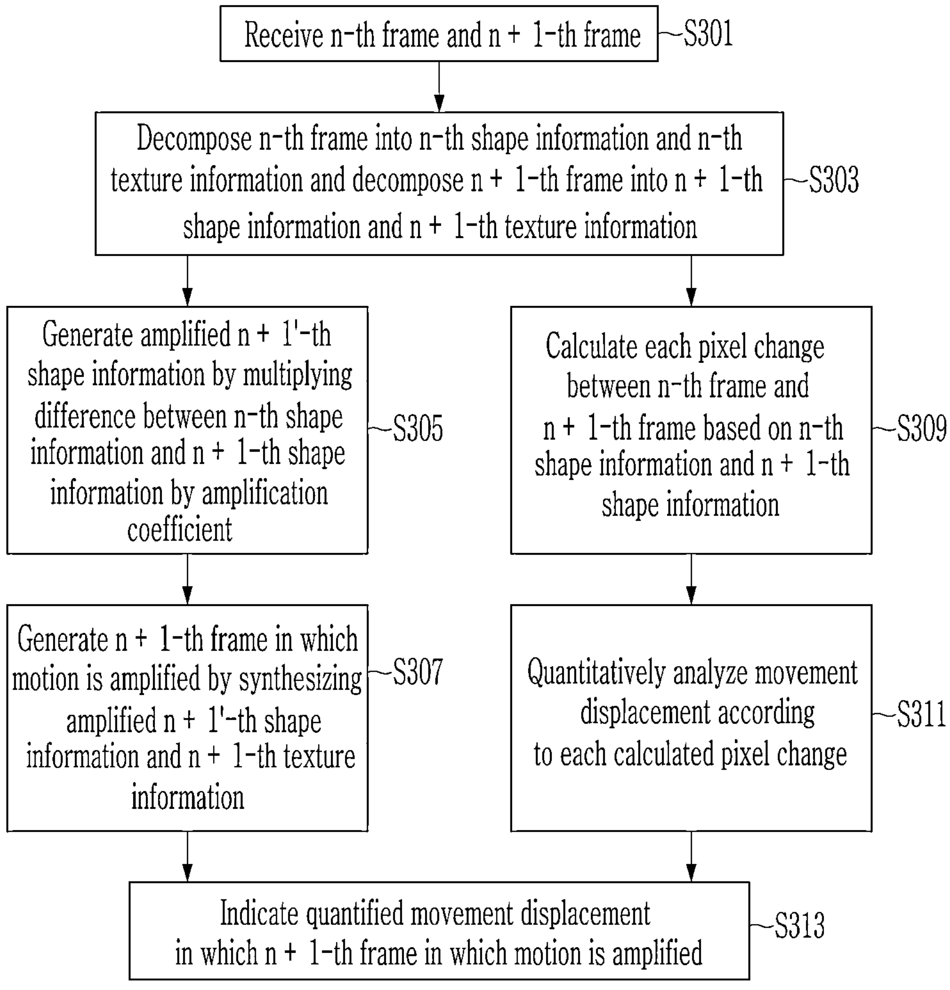
FIG. 3 is a flowchart of a motion amplification method according to the present disclosure.

FIG. 3 is a flowchart of a motion amplification method according to the present disclosure.

First, the encoder 231 receives an n-th frame and an n+1-th frame (S301).

The n-th frame and the n+1-th frame may be adjacent frames. Further, the encoder 231 may be trained to decompose the frame input into the encoder 231 into the shape information and the texture information by using an arbitrary data set prestored in the memory unit 250.

Then, the encoder 231 decomposes the n-th frame into n-th shape information and n-th texture information, and decomposes the n+1-th frame into n+1-th shape information and n+1-th texture information (S303). The encoder 231 may deliver the decomposed n-th shape information and n-th texture information, and n+1-th shape information and n+1-th texture information to the first module 233 and the second module 235.

The first module 233 multiplies a difference between the n-th shape information and the n+1-th shape information by an amplification coefficient to generate amplified n+1'-th shape information (S305).

The first module 233 synthesizes the amplified n+1'-th shape information, n-th shape information, and n+1-th texture information to generate an n+1-th frame in which the motion is amplified (S307). Therefore, the first module 233 may generate an amplification image in which the motion is emphasized.

Simultaneously, the second module 235 calculates each pixel change between the n-th frame and the n+1-th frame based on the n-th shape information and the n+1-th shape information (S309).

The second module 235 quantitatively analyzes the movement displacement according to each calculated pixel change (S311).

Thereafter, the third module 237 indicates a quantified movement displacement on the n+1-th frame in which the motion is amplified through the output unit 270 (S313).

When the movement displacement of the object analyzed through the output unit 270 exceeds a specific threshold, the third module 237 indicates a warning indication jointly in a part having vibration which exceeds the threshold. In this case, the specific threshold may be a threshold of the vibration per facility, which is prestored in the memory unit 250.

Figure 4:
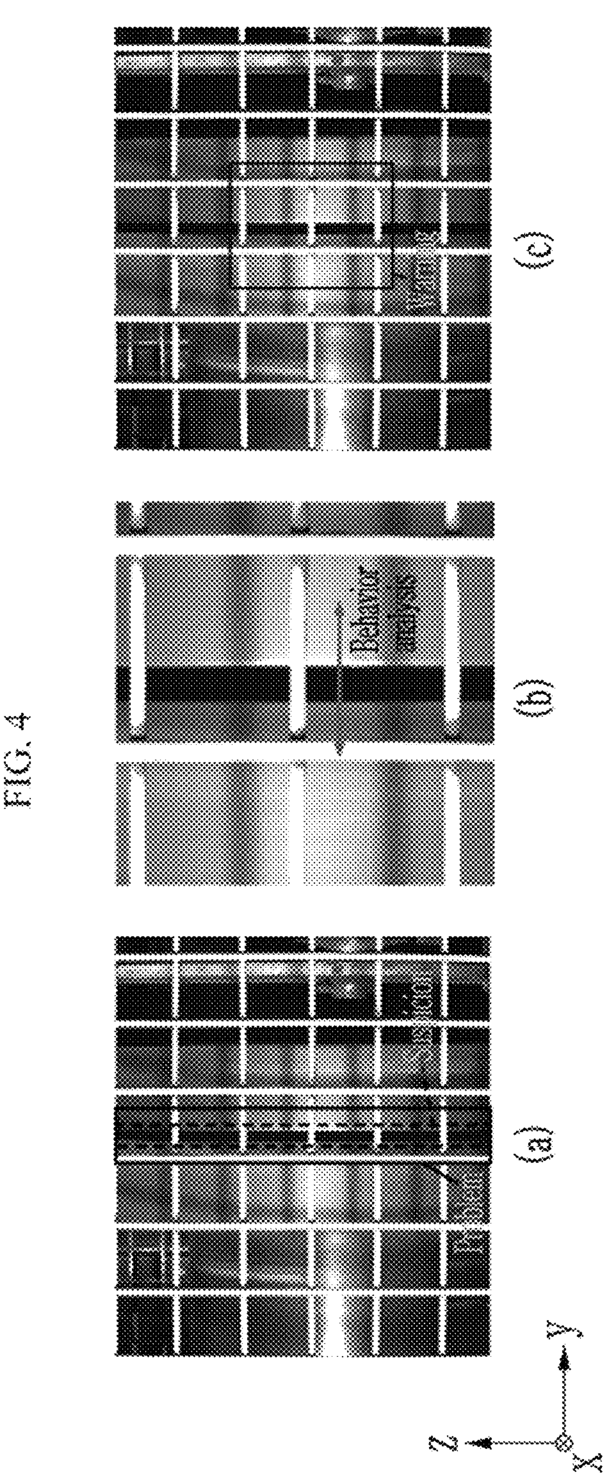
FIG. 4 is a diagram illustrating one example of a screen shown in an output unit of the motion amplification device according to the present disclosure.

FIG. 4 is a diagram illustrating one example of a screen shown in an output unit of the motion amplification device when the camera photographs a rotating facility.

FIG. 4A is a screen showing one frame in an image photographed by the camera 10 when the camera 10 photographs the rotating facility based on a y axis. The camera 10 may be installed to photograph a part which becomes a problem in a facility which needs to be observed. In this case, the camera 10 may photograph the image for the facility and transmit the photographed image to the motion amplification device 20 through the network in real time.

Here, the part which becomes the problem is a part at which the facility may vibrate in parallel to the rotational axis, i.e., in a y-axis direction. A motion which is parallel to an axial direction as a behavior which is undesirable for the facility needs to be observed.

The motion amplification device 20 may receive the image from the camera 10 and amplify the motion parallel to the axial direction through the first module 233, and analyze the motion through the second module 235.

FIG. 4B illustrates one example of the amplification image data.

In FIG. 4B, the movement displacement for the motion of the facility analyzed through the second module 235 is jointly indicated in the amplification image generated by the first module 233. For example, a behavior of the facility in a y-axis direction may be indicated.

FIG. 4C illustrates an example of the amplification image data in which the warning indication is shown in a part in which the object has the vibration which exceeds the threshold.

The memory unit 250 may store the threshold of the vibration which may be generated when the facility photographed by the camera 10 safely operates. When the facility vibrates over the prestored threshold of the vibration, the facility may be in a state which is not safe. The control unit 230 may indicate the warning indication in the corresponding part jointly when the facility vibrates over the specific threshold in the y-axis direction.

According to the motion amplification device according to the present disclosure, the vibration of the facility is amplified, and visualized on the screen to be determined with the naked eyes.

Further, according to the motion amplification device according to the present disclosure, the motion intensity of the facility which is suspected to have a defect can be quantitatively analyzed. The vibration size of the facility is quantitatively measured to determine a defective degree according to a measured result.

Further, according to the motion amplification device according to the present disclosure, there is an economical advantage by replacing a contact-type sensor. The contact-type sensor for expensive local diagnostic analysis and measurement can be replaced with a GPU and the camera to reduce costs. Furthermore, since the camera, which is a single mobile sensor, is used unlike the contact-type sensor, intuitive diagnosis for a wide range is possible, and a small number of sensors can diagnose a number of facilities. As a result, defects of facilities used in various industrial sites are accurately monitored to early diagnose a safe facility defect.

The exemplary embodiments described above may be implemented in a shape of a computer program which may be executed through various components on a computer, and such a computer program may be recorded in computer-readable media. In this case, examples of the media may include a hardware device particularly configured to store and execute program commands, magnetic media such as hard disks, floppy disks, and magnetic tape, optical recording media such as CD-ROM disks and DVD, magneto-optical media such as floptical disks, ROM, RAM, and flash memory units.

If there is no description of the steps constituting the method according to the exemplary embodiments, the steps may be performed in an appropriate order if there is no description of the order or contradictory. The present disclosure is not particularly limited according to the disclosed order of the above steps. The use of all examples or exemplary terms (e.g., etc.) in the present disclosure is to simply explain the present disclosure in detail, which is not limited to the scope of the present disclosure. In addition, it can be seen that by those skilled in the art, various modifications, combinations and changes within the claims and a scope equivalent thereto.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A motion amplification device comprising:

an encoder configured to receive a first frame and a second frame arbitrarily adjacent in order within an image for an object, and decompose the first frame into first shape information and first texture information and decompose the second frame into second shape information and second texture information;

a first module configured to generate a third frame in which a motion of the object is amplified based on the first shape information, the second shape information, and the second texture information;

a second module configured to analyze an intensity of the motion based on the first shape information, the second shape information, and the first texture information; and a third module configured to generate amplification image data indicating the intensity of the motion on the third frame.

2. The motion amplification device of claim 1, wherein:

the first module configured to multiply a difference between the first shape information and the second shape information by a predetermined amplification coefficient to generate new shape information, and synthesize the new shape information and the second texture information to generate the third frame.

3. The motion amplification device of claim 2, wherein:

the second module is configured to calculate each pixel change between the first frame and the second frame based on the first shape information and the second shape information, and analyze the intensity of the motion of the object based on each calculated pixel change.

4. The motion amplification device of claim 3, wherein:

the second module is configured to analyze the intensity of the motion of the object by using a convolutional neural network (CNN) trained to analyze the intensity of the motion from input shape information of arbitrary frames.

5. The motion amplification device of claim 3, further comprising:

a memory configured to store a vibration threshold for the object; and an output unit configured to output the amplification image data, wherein the third module determines that an area in which the motion exceeding the vibration threshold is detected is a dangerous area which needs to be checked when the intensity of the motion exceeds the vibration threshold, and generates the amplification image data to indicate the dangerous area on the amplification image data.

6. A motion amplification method comprising:

receiving a first frame and a second frame arbitrarily adjacent in order within an image for an object, and decomposing the first frame into first shape information and first texture information and decomposing the second frame into second shape information and second texture information;

generating a third frame in which a motion of the object is amplified based on the first shape information, the second shape information, and the second texture information;

analyzing an intensity of the motion by calculating each pixel change between the first frame and the second frame based on the first shape information and the second shape information, and analyzing the intensity of the motion of the object based on each calculated pixel change; and generating amplification image data indicating the intensity of the motion on the third frame.

7. The motion amplification method of claim 6, wherein the generating of the third frame includes multiplying a difference between the first shape information and the second shape information by a predetermined amplification coefficient to generate new shape information, and synthesizing the generated shape information and the second texture information to generate the third frame.

8. The motion amplification method of claim 7, wherein the analyzing of the intensity of the motion further includes analyzing the intensity of the motion of the object by using a convolutional neural network (CNN) trained to analyze the intensity of the motion from input shape information of arbitrary frames.

9. The motion amplification method of claim 8, wherein the generating of the third frame includes determining that an area in which the motion exceeding a vibration threshold is detected a dangerous area which needs to be checked when the intensity of the motion exceeds the vibration threshold prestored for the object, and generating the amplification image data to indicate the dangerous area on the amplification image data.

10. A non-transitory computer-readable medium having a program performing the method of claim 6, which is stored therein.

* * * * *